March 5, 1940.  C. J. HOLSLAG  2,192,312
CURRENT ADJUSTING MEANS
Filed March 17, 1938
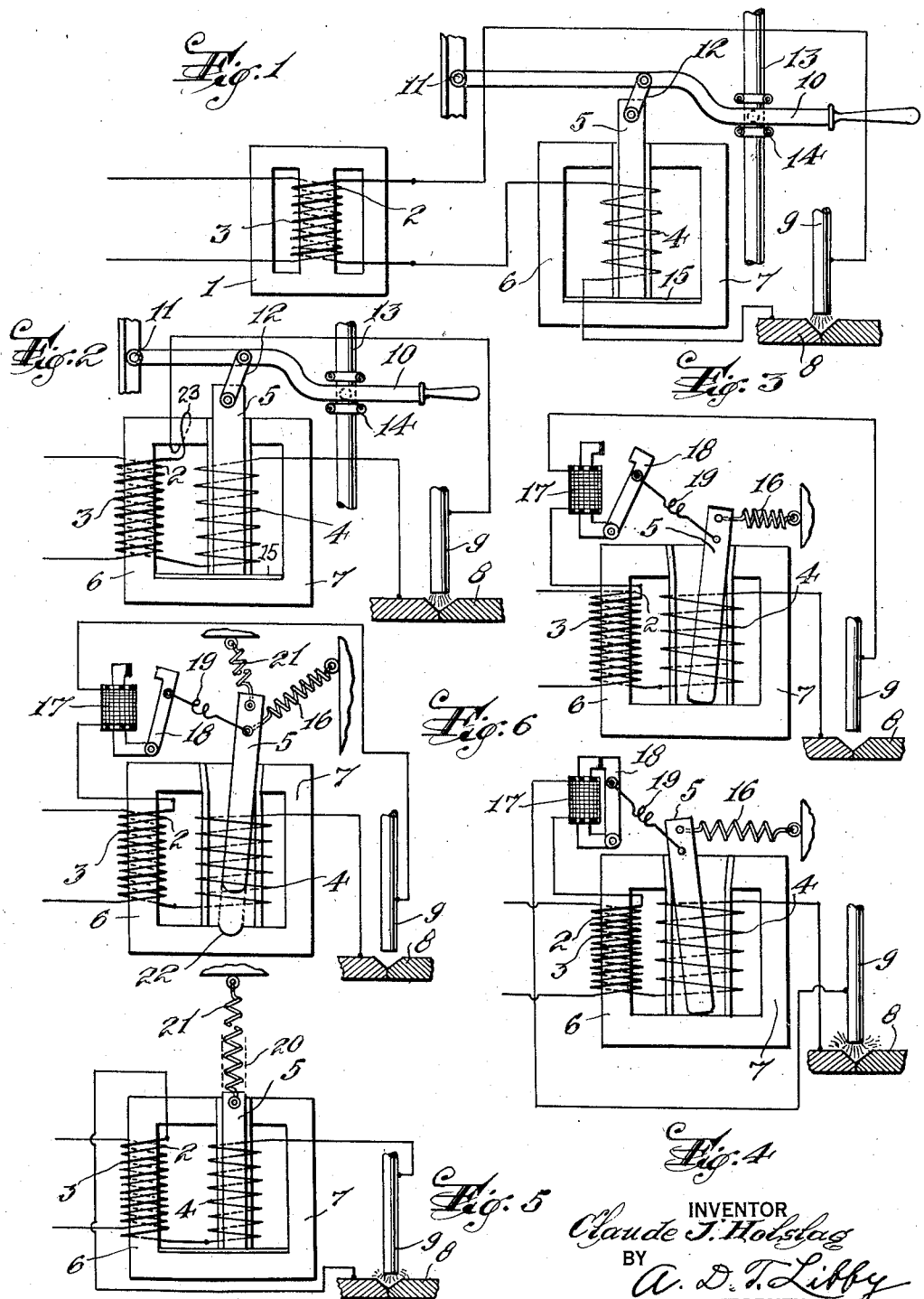
INVENTOR
Claude J. Holslag
BY
A. D. T. Libby
ATTORNEY Patented Mar. 5, 1940

2,192,312

UNITED STATES PATENT OFFICE 2,192,312

CURRENT-ADJUSTING MEANS

Claude J. Holslag, South Orange, N. J., assignor to Electric Arc Cutting & Welding Company, Newark, N. J.

Application March 17, 1938, Serial No. 196,386

12 Claims. (Cl. 171—119)

This invention relates to a current-adjusting means which is especially adapted for use in connection with alternating current arc welding.

In my Patents 1,305,361-2-3, I have shown and described arc welding transformers in which the current is changed to meet the welding requirements within the range of capacity of any machine, by means of taps on the windings and also by means of an adjustable flux diverter. The flux diverter, constructed and arranged as described in said patents, is noisy and is very hard to adjust when current is flowing in the arc circuit. After many years' experience with machines built according to said patents, I have discovered a much improved manner of obtaining current changes without the necessity of taps or difficulty in adjusting what may be termed a flux diverter or core leg while current is flowing in the arc circuit, as may be the case when the apparatus to be hereinafter described is used with automatic welding; or, as many times happens, a welder may want to have an assistant adjust the flux diverter while he is welding so that he can better determine the best value of current to use.

It is therefore the principal object of my present invention to provide a much improved type of current-adjusting means. These improvements will be readily understood by reference to the annexed drawing and from the description thereof. In the drawing, Figure 1 illustrates one form of my invention as applied to a separate reactor used in the load circuit.

Figure 2 shows my improved construction built into the transformer itself.

Figure 3 is a view similar to Figure 2, but showing a modified form of control, the parts being shown in the condition of open circuit.

Figure 4 is a view similar to Figure 3, but with the load or arc circuit closed.

Figure 5 illustrates a still further modified form of construction.

Figure 6 shows a further modified form of my invention.

In the various views, wherein like numbers refer to corresponding parts, 1 illustrates the core of a transformer of the shell type having a primary winding 2 and a secondary winding 3 on one leg of the core. One end of the secondary winding 3 is connected to one end of a winding 4 which surrounds or encompasses the middle leg 5 of a core having legs 6 and 7 which together with the other parts, comprise a reactor. The other end of the winding 4 is connected to the work 8 to be welded, while the movable electrode 9 is connected to the other end of the secondary winding 3.

The core 5 of the reactor is adapted to be moved out and in with respect to the winding 4. One means for doing this, as shown in Figure 1, comprises a lever 10 pivoted at 11 and connected to the core 5 in any satisfactory manner as by a link 12. A standard 13 is used to lock the handle 10 thereon in any position by means of a clamping device 14.

When the core 5 is in the position shown in Figure 1, the inner end of the core rests on a piece 15, preferably of non-magnetic material, so that there is a slight flux gap at this point. When it is desired to increase the current, the lever 10 is raised, lifting the core 5 upwardly, thereby decreasing the reactance of the reactor. As the passage of the magnetic flux from the legs 6 and 7 into the core 5 at the top is substantially at right anges to the core 5, the same remains in substantially balanced relation, and vibration is eliminated. Furthermore, the core can be very easily moved in either direction, even though the heaviest current within the range of the apparatus is passing through the winding 4.

In Figure 2 the current-adjusting means is included as a part of the transformer, the leg 6 of which carries the primary winding 2 and the main secondary winding 3. The winding 4 of Figure 1 now becomes the auxiliary secondary winding of the transformer. When the core is in the position of Figure 2, the voltage generated by the winding 4 is a maximum, and this assists in starting the arc between the electrodes 8 and 9. In this position, the current through the arc is the smallest. When the core 5 is withdrawn from the winding 4, the voltage generated by this winding is reduced, while the current increases, which means less KVA and a much improved power factor.

The operation of the transformer may be improved by adding a few steady turns 23 as indicated.

In Figure 3 the middle leg or core 5 is arranged so that it may be tilted, and is held by a spring 16 in the position indicated when the load or arc circuit is open. In this arrangement and in this position of the core 5, the open circuit voltage existing across the electrodes is reduced because the flux through the core 5 is at a minimum. This has one big advantage in that an operator in putting an electrode into the handle, in manual welding, will not receive a shock if he touches the electrode with his bare hands. When the electrodes 8 and 9 are brought into contact, a heavy current flows through the secondary windings 3 and 4 and through the electro-magnet 17 which is in series with the load or arc circuit. This will actuate the armature 18 and move the core 5 to the position shown in Figure 4, thereby increasing the voltage applied to the electrodes and making it easier to sustain the arc. The current is automatically regulated by an adjustment (these adjustments not being shown) of the spring devices 16 and 19.

In Figure 5, the core 5 is normally held in the position indicated by the dotted line 20, by a spring 21 in which position the voltage of the winding 4 is at a minimum, but when the electrodes 8 and 9 are brought into contact, the core 5 is drawn to the position shown in Figure 5, but as the arc is started, the core 5 will take up some intermediate position, depending on the length of the arc.

Figure 6 is a combination of Figures 3, 4 and 5. In this figure, the inner end of the core 5 has a seat 22 in the bottom core leg of the transformer. As shown in Figure 6, the core leg 5 is drawn upwardly from the seat 22 and at the same time is held toward the core leg 7 by the spring 16. When the electrodes 8 and 9 are brought into contact, the core 5 will be drawn down against its seat 22 and to the left toward the core leg 6. After the arc is drawn and continues in operation, the leg 5 will take up some intermediate position.

In manual arc welding, I prefer the form shown in Figure 2, which gives close changes in current over a very wide range and eliminates all the difficulties experienced with prior structures to which reference has been made.

It is to be understood that the drawing is more or less diagrammatic in form and no attempt has been made to illustrate all the minor details. For example, instead of the hand adjustment of the structure shown in Figure 2, the adjustment may be done by a push-button at the welding handle and a motor or electro-magnetic device controlled by such push-button. In addition, the auxiliary secondary winding 4 may be wound with tubing through which a cooling circulating fluid may be passed, or the whole transformer may be cooled by a fan.

What I claim is:

1. A current-adjusting means including, a three-legged core of suitable magnetic material, the core having a bottom yoke joining the outer legs and a divided top yoke, between the division of which the middle core leg is positioned for movement therebetween, the entire middle leg being mechanically separate from the rest of the core and movable and having a stationary winding in a load circuit and encompassing said middle core leg, with means for moving it to change the current through its winding to the load.

2. A current-adjusting means including a three-legged core of suitable magnetic material, the core having a bottom yoke joining the outer legs and a divided top yoke, between the division of which the middle core leg is positioned for movement therebetween, the entire middle core leg being mechanically separate from the rest of the core and movable and having a stationary winding in a load circuit and encompassing said leg, and means for moving the said core leg in and out of its winding to change the value of the current going to the load.

3. A current-adjusting means including a three-legged core of suitable magnetic material, the core having a bottom yoke joining the outer legs and a divided top yoke, between the division of which the middle core leg is positioned for movement therebetween, the entire middle core leg being mechanically separate from the rest of the core and movable and having a stationary winding in a load circuit including load terminals and encompassing said leg, the voltage at the load terminals being a maximum when the core is in yoke bridging position to cause its winding to deliver minimum current.

4. A transformer having a three-legged core, the core having a bottom yoke joining the outer legs and a divided top yoke, between the divisions of which the middle core leg is positioned for movement therebetween, the entire middle leg being mechanically separate from the rest of the core and movable, primary and main secondary windings on one leg and an auxiliary secondary stationary winding around the middle leg, and means for moving the middle core leg to change the current delivered by the transformer.

5. A transformer having a three-legged core, the core having a bottom yoke joining the outer legs and a divided top yoke, between the divisions of which the middle core leg is positioned for movement therebetween, the entire middle leg being mechanically separate from the rest of the core and movable, primary and main secondary windings on one leg and an auxiliary secondary stationary winding around the middle leg, and means for moving the middle core leg in and out of its winding to change the current delivered by the transformer.

6. A transformer having a three-legged core, the core having a bottom yoke joining the outer legs and a divided top yoke, between the divisions of which the middle core leg is positioned for movement therebetween, the entire middle leg being mechanically separate from the rest of the core and movable, primary and main secondary windings on one leg and an auxiliary secondary stationary winding around the middle leg, and means for tilting the middle core leg within its winding to change the current delivered by the transformer.

7. A transformer having a three-legged core, the core having a bottom yoke joining the outer legs and a divided top yoke, between the divisions of which the middle core leg is positioned for movement therebetween, the entire middle leg being mechanically separate from the rest of the core and movable, primary and main secondary windings on one leg and an auxiliary secondary stationary winding around the middle leg, and automatic means at least partially under control of the current in the load circuit for moving the middle core leg to change the current delivered by the transformer.

8. A transformer having a three-legged core, the core having a bottom yoke joining the outer legs and a divided top yoke, between the divisions of which the middle core leg is positioned for movement therebetween, the entire middle leg being mechanically separate from the rest of the core and movable, primary and main secondary windings on one leg and an auxiliary secondary stationary winding around the middle leg, and automatic means at least partially under control of the current in the load circuit for tilting and moving in and out, the middle core leg to change the current delivered by the transformer.

9. An alternating current arc welding transformer comprising a three-legged core having primary and main secondary windings on one leg and an auxiliary secondary on the middle leg thereof, the core having a bottom yoke joining the outer legs and a divided tope yoke, between the divisions of which the middle core leg is positioned for movement therebetween, the entire middle leg being mechanically separate from the rest of the core and movable, means for obtaining full range of current within the capacity of the transformer without taps and shifting connections, said means including the middle core leg for the auxiliary secondary winding with means for moving this core leg to get the desired changes in current.

10 An alternating current arc welding transformer comprising a three-legged core having primary and main secondary windings on one leg and an auxiliary secondary on the middle leg thereof, the core having a bottom yoke joining the outer legs and a divided top yoke, between the divisions of which the middle core leg is positioned for movement therebetween, the entire middle leg being mechanically separate from the rest of the core and movable, means for obtaining full range of current within the capacity of the transformer without taps and shifting connections, said means including the middle core leg with means for moving said entire core leg in and out of its winding to get the desired changes in current.

11. An alternating current arc welding transformer comprising a three-legged core having primary and main secondary windings on one leg and an auxiliary secondary on the middle leg thereof, the core having a bottom yoke joining the outer legs and a divided top yoke, between the divisions of which the middle core leg is positioned for movement therebetween, the entire middle leg being mechanically separate from the rest of the core and movable, means for obtaining full range of current within the capacity of the transformer without taps and shifting connections, said means including the middle core leg with means for moving said core leg in and out of its winding, and further means for tilting the said core leg to get the desired current changes.

12. In an alternating current arc welding transformer, means for obtaining an improved power factor, said means comprising a three-legged core, the core having a bottom yoke joining the outer legs and making only a relatively poor magnetic union with the middle leg which is mechanically separate from the rest of the core, the core also having a divided top yoke, between the divisions of which the middle core leg is positioned for movement therebetween, said core having primary and main secondary windings on one leg and a stationary auxiliary secondary winding on the middle leg, with means for moving the entire middle core leg out of its winding to lower the voltage of this winding, and increase the current from the transformer, and to get the reverse action when the core is moved within its winding.

CLAUDE J. HOLSLAG.